(No Model.) 2 Sheets—Sheet 1.

J. D. HOLMES & W. L. HEATH.
AUTOMATIC CIRCUIT CLOSING DEVICE FOR GALVANIC BATTERIES.

No. 572,754. Patented Dec. 8, 1896.

Witnesses
W. C. Alexander.
E. E. Vennell.

Inventors
John D. Holmes
Webster L. Heath
By Attorneys
Fowler & Fowler

THE NORRIS PETERS CO., PHOTO-LITHO., WASHINGTON, D. C.

(No Model.) 2 Sheets—Sheet 2.

J. D. HOLMES & W. L. HEATH.
AUTOMATIC CIRCUIT CLOSING DEVICE FOR GALVANIC BATTERIES.

No. 572,754. Patented Dec. 8, 1896.

Witnesses
W. G. Alexander.
E. E. Vennell.

Inventors
John D. Holmes,
Webster L. Heath
By Attorneys
Fowler & Fowler

UNITED STATES PATENT OFFICE.

JOHN D. HOLMES AND WEBSTER L. HEATH, OF ST. LOUIS, MISSOURI.

AUTOMATIC CIRCUIT-CLOSING DEVICE FOR GALVANIC BATTERIES.

SPECIFICATION forming part of Letters Patent No. 572,754, dated December 8, 1896.

Application filed October 1, 1896. Serial No. 607,591. (No model.)

*To all whom it may concern:*

Be it known that we, JOHN D. HOLMES and WEBSTER L. HEATH, citizens of the United States, residing at the city of St. Louis, in the State of Missouri, have invented a certain new and useful Automatic Circuit-Closing Device for Galvanic Batteries, of which the following is such a full, clear, and exact description as will enable any one skilled in the art to which it appertains to make and use the same, reference being had to the accompanying drawings, forming part of this specification.

Our invention relates to means for automatically preventing the breaking of the circuit in a galvanic battery by the escape of the fluid from one or more of the cells.

Our invention is especially designed for use in connection with a battery composed of gravity-cells, but may be used in connection with a battery of any other type of wet cells.

Our invention would be of no advantage in connection with a battery in which all the cells are connected in multiple, but can be used when either all the cells or any number of them are connected in series.

In galvanic cells using a fluid, and especially in the type known as "gravity-cells," the glass vessels in which the fluid is contained, from some cause, the nature of which we are not aware, are very liable to crack and allow the escape of the fluid. This breaks the circuit through the cell, and consequently through the entire battery, if all the cells are arranged in series, or, if the cells are arranged partly in series and partly in multiple, through all the cells of the series in which the said cell is situated.

The object of our invention is to provide means controlled by the rise and fall of the liquid in the cells for preventing the breaking of the circuit above referred to.

Our invention consists in the various novel features and details of construction set forth in the following specification and pointed out in the claims affixed hereto.

Figure 1:
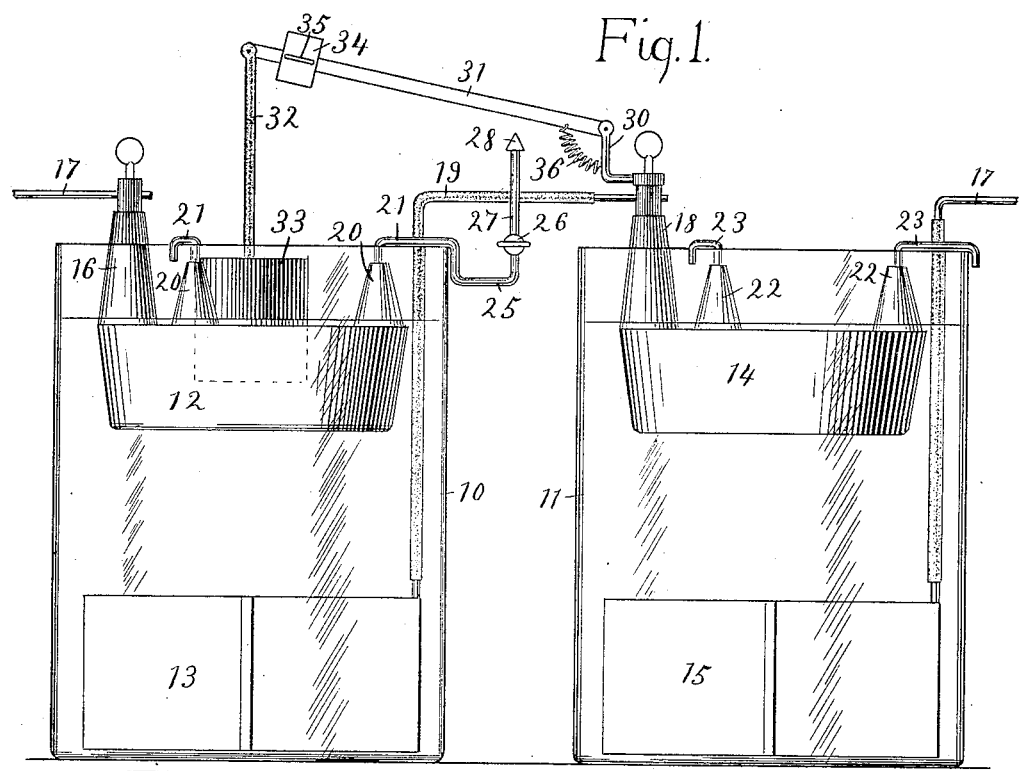
Figure 2:
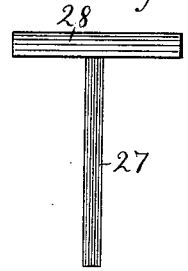
Figure 3:
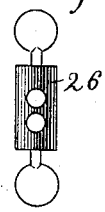
Figure 4:
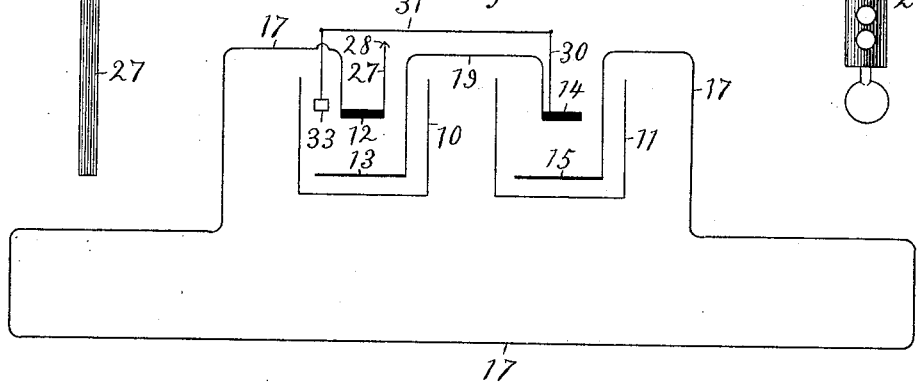
Figure 5:
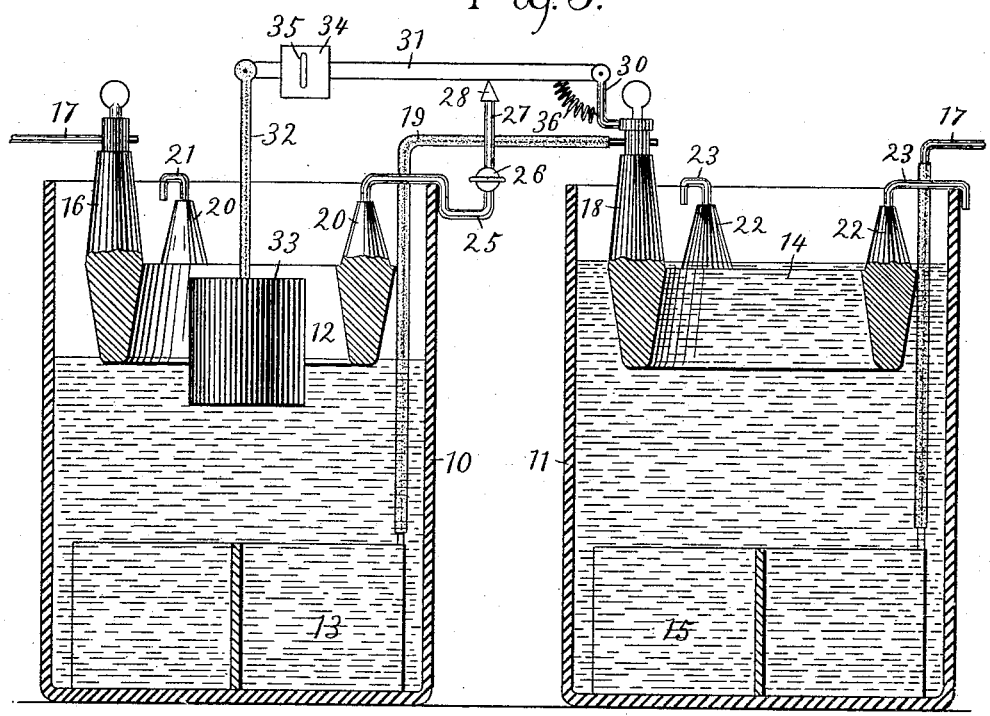
Figure 6:
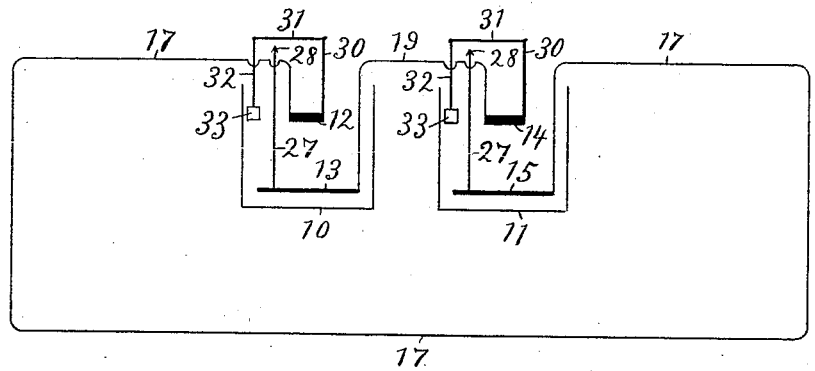

In the accompanying drawings, which illustrate a battery of two gravity-cells embodying our invention, Figure 1 is a side elevation. Figs. 2 and 3 are enlarged views of details. Fig. 4 is a diagrammatical view. Fig. 5 is a vertical section. Fig. 6 is a diagram showing a slight modification.

Like marks of reference refer to similar parts in the various views of the drawings.

10 and 11 are two glass vessels, which will be referred to as the "cells" 10 and 11, respectively. In the cell 10 is a zinc element 12 and a copper element 13, and in the cell 11 a zinc element 14 and a copper element 15. On the zinc 12 is a projection 16, carrying a binding-post to which is attached one end of the line-wire 17, the other end of which is secured to the copper 15. On the zinc 14 is a projection 18, provided with a binding-post to which is secured one end of an insulated wire 19, the other end of which is secured to the copper 13. On the zinc 12 are projections 20, preferably three in number, provided with wires 21 for engaging with the edge of the cell 10, and thus holding the zinc 12 in position. On the zinc 14 are projections 22, similar to the projection 20 and provided with wires 23 for holding the said zinc 14 in position.

One of the wires 21 is provided with an extension 25, to which is secured one end of a double binding-post 26, (shown in detail in Fig. 3,) in the other end of which is secured a rod 27, carrying a knife-edge contact-bar 28. By loosening the binding-post at the end in which the rod 27 is carried the contact 28 can be adjusted to the required height.

Secured to the zinc 14, preferably by means of the projection 18, or the binding-post carried thereby, is an L-shaped arm 30, to which is pivoted a contact-bar 31, adapted to engage with the contact 28. To the end of the bar 31 is pivoted a rod 32, to which is attached a float 33, of cork or other suitable material, which floats in the fluid in the cell 10. The rod 32 is made of gutta-percha or other insulating material, so as to prevent the short-circuiting of the cell. On the bar 31 is a weight or counterpoise 34, which may be slid along the said bar and secured in any desired position by means of a thumb-screw 35. By means of the weight 34 the depth to which the float 33 is submerged in the fluid of the cell 10 can be regulated. To insure a good electrical connection between the bar 31 and the arm 30, a small wire coil 36 is firmly secured at one end to the said bar and at the other to the said arm. When more than two cells are used, each succeeding cell is provided with a device like that above described. At the end of the series at which the line-wire 17 is led to the copper element the arm 30 may be held by any suitable support and connected electrically to the line-wire, or the cell at this end of the series may be provided with a circuit-closing device like that shown in the modification hereinafter to be described.

In the modification diagrammatically shown in Fig. 6 the rod 27, carrying the fixed contact 28, is secured to the copper 13, and the movable contact 31 is secured to the zinc 12 of the same cell. This ultimately connects the zinc 12 with the zinc 14, as in the previously-described construction, the copper 13 and conductor 19 being included in the connection, however. The principal difference in the construction is that the entire circuit-closing device is carried by one cell. When this construction is used, the cell at the end of the series can be arranged like the others.

The operation of our device is as follows: If the cell 10 should become cracked, so that the fluid would escape, the float 33 descends as the level of the fluid falls until the contact-bar 31 touches the contact 28. The point at which this occurs should be just before the zinc 12 ceases to touch the fluid, as shown in Fig. 5, so that not even a momentary break will occur in the circuit. The adjustment can be secured by raising or lowering the rod 27 and sliding the weight 34 on the bar 31. As soon as the contact 31 touches the contact 28 the current passes from the zinc 14, through the arm 30, contacts 31 and 28, rod 27, and wire 21, to the zinc 12, from which it passes to the line-wire 17.

The operation of the modification shown in Fig. 6 is so similar to that described as to require no separate description, the only difference being that the conductor 19 and copper 13 are included in the above-described circuit.

Having fully described our invention, what we claim as new, and desire to secure by Letters Patent of the United States, is—

1. The combination with two or more cells of a battery connected in series, of circuit-closing devices actuated by the rise and fall of the fluid of said cells for closing a metallic circuit through any cell when the fluid in it has fallen to a predetermined level.

2. The combination with two cells of a battery connected in series, of a fixed contact in electrical communication with one element of one cell, and a movable contact in electrical communication with the corresponding element of the other cell and controlled by the rise and fall of the fluid in one of said cells, whereby electrical communication will be established between said corresponding elements when the fluid in one cell falls to a predetermined level.

3. The combination with two cells of a battery connected in series, of a fixed contact in electrical communication with one element of one cell, a movable contact in electrical communication with the corresponding element of the other cell, and a float in said first-named cell and governing the movement of said movable contact.

4. The combination with two cells of a battery, of a fixed contact in electrical communication with one element of one cell, a movable contact in electrical communication with the corresponding element of the other cell, a float in one of said cells and governing the movement of said movable contact, and means for varying the point at which said contacts will meet.

5. The combination with two cells of a battery connected in series, of a fixed contact carried by and in electrical communication with one element of one of said cells, a movable contact carried by and in electrical communication with the corresponding element of the other cell, and a float situated in said first-named cell and governing the movement of said movable contact, whereby electrical communication will be established between said elements when the fluid in the first-named cell has fallen to a predetermined level.

In testimony whereof we have hereunto set our hands and affixed our seals in the presence of the two subscribing witnesses.

JOHN D. HOLMES. [L. S.]
WEBSTER L. HEATH. [L. S.]

Witnesses:
W. A. ALEXANDER,
E. E. VEMELL.